US012327239B2

(12) United States Patent
Wagner (10) Patent No.: US 12,327,239 B2
(45) Date of Patent: *Jun. 10, 2025

(54) SYSTEM, METHOD, AND COMPUTER PROGRAM PRODUCT FOR SECURED, ENCRYPTED TRANSACTION PROCESSING

(71) Applicant: Visa International Service Association, San Francisco, CA (US)

(72) Inventor: Kim R. Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 18/125,784

(22) Filed: Mar. 24, 2023

(65) Prior Publication Data

US 2023/0245106 A1 Aug. 3, 2023

Related U.S. Application Data

(63) Continuation of application No. 17/019,410, filed on Sep. 14, 2020, now Pat. No. 11,636,467.

(51) Int. Cl.
*G06Q 20/36* (2012.01)
*G06Q 20/10* (2012.01)
(Continued)

(52) U.S. Cl.
CPC ....... *G06Q 20/3676* (2013.01); *G06Q 20/108* (2013.01); *G06Q 20/3672* (2013.01);
(Continued)

(58) Field of Classification Search
CPC . G06Q 20/00–425; G06Q 2220/00–18; G06Q 40/00–128; G06Q 50/00–60; H04L 2209/00–88; H04L 9/00–50
See application file for complete search history.

(56) References Cited

U.S. PATENT DOCUMENTS 11,636,467 B2 * 4/2023 Wagner ................. H04L 9/3073
705/66
11,829,961 B1 * 11/2023 Wood ....................... H04L 9/50
(Continued)

FOREIGN PATENT DOCUMENTS

CA 3103565 A1 * 8/2021 ............. G06F 16/27
CN 114936852 A * 8/2022
(Continued)

OTHER PUBLICATIONS

Baldimtsi et al., "Accumulators with Applications to Anonymity-Preserving Revocation", IEEE European Symposium on Security and Privacy, IEEE, Apr. 2017, pp. 1-37.
(Continued)

*Primary Examiner* — Chenyuh Kuo
(74) *Attorney, Agent, or Firm* — The Webb Law Firm (57) ABSTRACT

A system, method, and computer program product is provided for secured, encrypted transaction processing. The method includes receiving a transaction request including a first user token including a first account balance, a second user token including a second account balance, and a transaction value. The method also includes generating a new first account balance by executing a zero-knowledge subtraction, and a new first user token including the new first account balance. The method further includes generating a new second account balance by executing a zero-knowledge addition, and a new second user token including the new second account balance. The method further includes transmitting the new tokens to the respective computing devices. The method further includes receiving a new transaction request including the new first user token and/or the new second user token, and generating a new account balance by executing a zero-knowledge computation based on the new transaction request.

20 Claims, 6 Drawing Sheets

(51) Int. Cl.
*G06Q 20/38* (2012.01)
*G06Q 20/40* (2012.01)
*G06Q 40/02* (2023.01)
*H04L 9/30* (2006.01)
*H04L 9/32* (2006.01)
*G06Q 50/00* (2012.01)

(52) U.S. Cl.
CPC ..... *G06Q 20/3674* (2013.01); *G06Q 20/3825* (2013.01); *G06Q 20/3829* (2013.01); *G06Q 20/401* (2013.01); *G06Q 40/02* (2013.01); *H04L 9/3073* (2013.01); *H04L 9/3213* (2013.01); *H04L 9/3221* (2013.01); *G06Q 50/01* (2013.01); *G06Q 2220/00* (2013.01); *H04L 2209/56* (2013.01)

(56) References Cited

U.S. PATENT DOCUMENTS

| | | | |
|---|---|---|---|
| 2004/0098352 A1 | 5/2004 | Matsuyama | |
| 2014/0358786 A1* | 12/2014 | Van Heerden | G06Q 20/3821 705/44 |
| 2019/0130391 A1 | 5/2019 | Wright et al. | |
| 2019/0164153 A1 | 5/2019 | Agrawal et al. | |
| 2019/0172060 A1* | 6/2019 | Wettan | G06Q 20/3821 |
| 2019/0238311 A1 | 8/2019 | Zheng | |
| 2019/0251558 A1 | 8/2019 | Liu et al. | |
| 2020/0184557 A1 | 6/2020 | Wang | |
| 2020/0228506 A1 | 7/2020 | Shockley et al. | |
| 2020/0311695 A1 | 10/2020 | Cao et al. | |
| 2020/0374135 A1 | 11/2020 | Lu et al. | |
| 2021/0319479 A1 | 10/2021 | Taudes | |
| 2022/0014502 A1* | 1/2022 | Gauthier | H04L 9/30 |
| 2022/0084014 A1 | 3/2022 | Wagner | |
| 2022/0138707 A1 | 5/2022 | Makrides | |
| 2023/0186296 A1* | 6/2023 | Vines | G06Q 20/3829 705/71 |
| 2024/0062283 A1* | 2/2024 | Czok | G06Q 40/125 |

FOREIGN PATENT DOCUMENTS

| | | |
|---|---|---|
| DE | 202015009601 U1 | 7/2018 |
| GB | 2528471 A | 1/2016 |

OTHER PUBLICATIONS

Camenisch, "Concepts Around Privacy-Preserving Attribute-Based Credentials", IFIP Advances in Information and Communication Technology, 2014, pp. 53-63, vol. 421, Springer, Berlin, Heidelberg.
Yasusaka et al., "Privacy-Preserving Pre-Consensus Protocol for Blockchains", 2019, 8 pages.

* cited by examiner

SYSTEM, METHOD, AND COMPUTER PROGRAM PRODUCT FOR SECURED, ENCRYPTED TRANSACTION PROCESSING

CROSS REFERENCE TO RELATED APPLICATION

This application is a continuation of U.S. patent application Ser. No. 17/019,410, filed Sep. 14, 2020, the disclosure of which is hereby incorporated in its entirety by reference.

BACKGROUND

1. Technical Field

This disclosure relates generally to encrypted communications and secured transactions and, in some non-limiting embodiments or aspects, systems, methods, and computer program products, for conducting secured, encrypted transactions between computing devices while obfuscating transaction data from a central processing system.

2. Technical Considerations

Cryptocurrency transaction schemes often have the advantage of privacy due to non-centralized processing, but they can be computationally slow due to using a non-trust consensus protocol. Cryptocurrencies may also lack security protocols against the loss of private keys or third party attacks. Transactions via electronic checking accounts provide the advantage of security controls of associated issuer institutions and transaction service providers, but these methods may be subject to the lack of privacy and dependency of the issuer institution that holds the funds of the checking account. Transaction values and account balances remain visible to transaction processing systems. There is a need in the art for a technical solution that provides privacy often associated with non-centralized cryptocurrency schemes while also enhancing security and speed in computation often provided by centralized, electronic banking schemes.

SUMMARY

According to non-limiting embodiments or aspects, provided is a computer-implemented method for secured, encrypted transaction processing. The method includes receiving, with a transaction processing system, a transaction request initiated by at least one of a first computing device associated with a first user and a second computing device associated with a second user. The transaction request includes a first user token including a first token identifier and a first account balance. The first account balance is encrypted with a public key of a public/private key pair associated with the first user. The transaction request also includes a second user token including a second token identifier and a second account balance. The second account balance is encrypted with a public key of a public/private key pair associated with the second user. The transaction request also includes a transaction value. The method includes, in response to verifying the transaction request, generating, with the transaction processing system using a zero-knowledge computation, a new first account balance and a new second account balance based on the first account balance, the second account balance, and the transaction value. The method includes generating, with the transaction processing system, a new first user token including the new first account balance, the new first account balance encrypted with the public key of the public/private key pair associated with the first user. The method includes generating, with the transaction processing system, a new second user token including the new second account balance, the new second account balance encrypted with the public key of the public/private key pair associated with the second user.

In some non-limiting embodiments or aspects, the method may include, in response to receiving, from an issuer system associated with the first user, a first initial account balance encrypted with the public key of the public/private key pair associated with the first user, generating, with the transaction processing system, the first user token, and communicating, with the transaction processing system, the first user token to the first computing device associated with the first user.

In some non-limiting embodiments or aspects, the method may include, in response to receiving, from an issuer system associated with the second user, a second initial account balance encrypted with the public key of the public/private key pair associated with the second user, generating with the transaction processing system, the second user token, and communicating, with the transaction processing system, the second user token to the second computing device associated with the second user.

In some non-limiting embodiments or aspects, the transaction value may be encrypted with the public key of the public/private key pair associated with the first user. Generating the new first account balance may include executing, by the transaction processing system, a zero-knowledge subtraction of the transaction value from the first account balance. The new first user token may be digitally signed by the transaction processing system. Generating the new second account balance may include executing, by the transaction processing system, a zero-knowledge addition of the transaction value to the second account balance. The new second user token may be digitally signed by the transaction processing system.

In some non-limiting embodiments or aspects, the transaction request may be digitally signed with a private key of the public/private key pair associated with the first user. Verifying the transaction request may include decrypting, by the transaction processing system, the transaction request using the public key of the public/private key pair associated with the first user. The transaction request may be further digitally signed with a private key of the public/private key pair associated with the second user. Verifying the transaction request may further include decrypting, by the transaction processing system, the transaction request using the public key of the public/private key pair associated with the second user.

According to non-limiting embodiments or aspects, provided is a system including at least one transaction processing server including at least one processor. The at least one transaction processing server is programmed or configured to receive a transaction request initiated by at least one of a first computing device associated with a first user and a second computing device associated with a second user. The transaction request includes a first user token including a first token identifier and a first account balance. The first account balance is encrypted with a public key of a public/private key pair associated with the first user. The transaction request includes a second user token including a second token identifier and a second account balance. The second account balance is encrypted with a public key of a public/private key pair associated with the second user. The transaction request also includes a transaction value. The at least one transaction processing server is programmed or configured to, in response to verifying the transaction request, generate, using a zero-knowledge computation, a new first account balance and a new second account balance based on the first account balance, the second account balance, and the transaction value. The at least one transaction processing server is programmed or configured to generate a new first user token including the new first account balance, the new first account balance encrypted with the public key of the public/private key pair associated with the first user. The at least one transaction processing server is programmed or configured to generate a new second user token including the new second account balance, the new second account balance encrypted with the public key of the public/private key pair associated with the second user.

In some non-limiting embodiments or aspects, the at least one transaction processing server may be further programmed or configured to, in response to receiving, from an issuer system associated with the first user, a first initial account balance encrypted with the public key of the public/private key pair associated with the first user, generate the first user token and communicate the first user token to the first computing device associated with the first user. The at least one transaction processing server may be further programmed or configured to, in response to receiving, from an issuer system associated with the second user, a second initial account balance encrypted with the public key of the public/private key pair associated with the second user, generate the second user token and communicate the second user token to the second computing device associated with the second user.

In some non-limiting embodiments or aspects, the transaction value may be encrypted with the public key of the public/private key pair associated with the first user. Generating the new first account balance may include executing a zero-knowledge subtraction of the transaction value from the first account balance. Generating the new second account balance may include executing a zero-knowledge addition of the transaction value to the second account balance. The new first user token and the new second user token may be digitally signed by the at least one transaction processing server.

In some non-limiting embodiments or aspects, the transaction request may be digitally signed with a private key of the public/private key pair associated with the first user. Verifying the transaction request may include decrypting the transaction request using the public key of the public/private key pair associated with the first user. The transaction request may be further digitally signed with a private key of the public/private key pair associated with the second user. Verifying the transaction request may further include decrypting the transaction request using the public key of the public/private key pair associated with the second user.

According to non-limiting embodiments or aspects, provided is a computer program product including at least one non-transitory computer-readable medium including program instructions that, when executed by at least one processor, cause the at least one processor to receive a transaction request initiated by at least one of a first computing device associated with a first user and a second computing device associated with a second user. The transaction request includes a first user token including a first token identifier and a first account balance, the first account balance encrypted with a public key of a public/private key pair associated with the first user. The transaction request includes a second user token including a second token identifier and a second account balance, the second account balance encrypted with a public key of a public/private key pair associated with the second user. The transaction request further includes a transaction value. The program instructions further cause the at least one processor to, in response to verifying the transaction request, generate, using a zero-knowledge computation, a new first account balance and a new second account balance based on the first account balance, the second account balance, and the transaction value. The program instructions further cause the at least one processor to generate a new first user token including the new first account balance, the new first account balance encrypted with the public key of the public/private key pair associated with the first user. The program instructions further cause the at least one processor to generate a new second user token including the new second account balance, the new second account balance encrypted with the public key of the public/private key pair associated with the second user.

In some non-limiting embodiments or aspects, the program instructions may further cause the at least one processor to, in response to receiving, from an issuer system associated with the first user, a first initial account balance encrypted with the public key of the public/private key pair associated with the first user, generate the first user token, and communicate the first user token to the first computing device associated with the first user. The program instructions may further cause the at least one processor to, in response to receiving, from an issuer system associated with the second user, a second initial account balance encrypted with the public key of the public/private key pair associated with the second user, generate the second user token, and communicate the second user token to the second computing device associated with the second user.

In some non-limiting embodiments or aspects, the transaction value may be encrypted with the public key of the public/private key pair associated with the first user. Generating the new first account balance may include executing a zero-knowledge subtraction of the transaction value from the first account balance. Generating the new second account balance may include executing a zero-knowledge addition of the transaction value to the second account balance. The new first user token and the new second user token may be digitally signed by the at least one transaction processing server.

In some non-limiting embodiments or aspects, the transaction request may be digitally signed with a private key of the public/private key pair associated with the first user. Verifying the transaction request may include decrypting the transaction request using the public key of the public/private key pair associated with the first user. The transaction request may be further digitally signed with a private key of the public/private key pair associated with the second user. Verifying the transaction request may further include decrypting the transaction request using the public key of the public/private key pair associated with the second user.

Other non-limiting embodiments or aspects will be set forth in the following numbered clauses:

Clause 1: A computer-implemented method comprising: receiving, with a transaction processing system, a transaction request initiated by at least one of a first computing device associated with a first user and a second computing device associated with a second user, the transaction request comprising: a first user token comprising a first token identifier and a first account balance, the first account balance encrypted with a public key of a public/private key pair associated with the first user; a second user token comprising a second token identifier and a second account balance, the second account balance encrypted with a public key of a public/private key pair associated with the second user; and a transaction value; in response to verifying the transaction request, generating, with the transaction processing system using a zero-knowledge computation, a new first account balance and a new second account balance based on the first account balance, the second account balance, and the transaction value; generating, with the transaction processing system, a new first user token comprising the new first account balance, the new first account balance encrypted with the public key of the public/private key pair associated with the first user; and generating, with the transaction processing system, a new second user token comprising the new second account balance, the new second account balance encrypted with the public key of the public/private key pair associated with the second user.

Clause 2: The computer-implemented method of clause 1, further comprising, in response to receiving, from an issuer system associated with the first user, a first initial account balance encrypted with the public key of the public/private key pair associated with the first user: generating, with the transaction processing system, the first user token; and communicating, with the transaction processing system, the first user token to the first computing device associated with the first user.

Clause 3: The computer-implemented method of clause 1 or clause 2, further comprising, in response to receiving, from an issuer system associated with the second user, a second initial account balance encrypted with the public key of the public/private key pair associated with the second user: generating with the transaction processing system, the second user token; and communicating, with the transaction processing system, the second user token to the second computing device associated with the second user.

Clause 4: The computer-implemented method of any of clauses 1-3, wherein the transaction value is encrypted with the public key of the public/private key pair associated with the first user.

Clause 5: The computer-implemented method of any of clauses 1-4, wherein generating the new first account balance comprises executing, by the transaction processing system, a zero-knowledge subtraction of the transaction value from the first account balance, and wherein the new first user token is digitally signed by the transaction processing system.

Clause 6: The computer-implemented method of any of clauses 1-5, wherein generating the new second account balance comprises executing, by the transaction processing system, a zero-knowledge addition of the transaction value to the second account balance, and wherein the new second user token is digitally signed by the transaction processing system.

Clause 7: The computer-implemented method of any of clauses 1-6, wherein the transaction request is digitally signed with a private key of the public/private key pair associated with the first user, and wherein verifying the transaction request comprises decrypting, by the transaction processing system, the transaction request using the public key of the public/private key pair associated with the first user.

Clause 8: The computer-implemented method of any of clauses 1-7, wherein the transaction request is further digitally signed with a private key of the public/private key pair associated with the second user, and wherein verifying the transaction request further comprises decrypting, by the transaction processing system, the transaction request using the public key of the public/private key pair associated with the second user.

Clause 9: A system comprising at least one transaction processing server including at least one processor, the at least one transaction processing server programmed or configured to: receive a transaction request initiated by at least one of a first computing device associated with a first user and a second computing device associated with a second user, the transaction request comprising: a first user token comprising a first token identifier and a first account balance, the first account balance encrypted with a public key of a public/private key pair associated with the first user; a second user token comprising a second token identifier and a second account balance, the second account balance encrypted with a public key of a public/private key pair associated with the second user; and a transaction value; in response to verifying the transaction request, generate, using a zero-knowledge computation, a new first account balance and a new second account balance based on the first account balance, the second account balance, and the transaction value; generate a new first user token comprising the new first account balance, the new first account balance encrypted with the public key of the public/private key pair associated with the first user; and generate a new second user token comprising the new second account balance, the new second account balance encrypted with the public key of the public/private key pair associated with the second user.

Clause 10: The system of clause 9, wherein the at least one transaction processing server is further programmed or configured to: in response to receiving, from an issuer system associated with the first user, a first initial account balance encrypted with the public key of the public/private key pair associated with the first user: generate the first user token; and communicate the first user token to the first computing device associated with the first user; and in response to receiving, from an issuer system associated with the second user, a second initial account balance encrypted with the public key of the public/private key pair associated with the second user: generate the second user token; and communicate the second user token to the second computing device associated with the second user.

Clause 11: The system of clause 9 or clause 10, wherein the transaction value is encrypted with the public key of the public/private key pair associated with the first user.

Clause 12: The system of any of clauses 9-11, wherein generating the new first account balance comprises executing a zero-knowledge subtraction of the transaction value from the first account balance, wherein generating the new second account balance comprises executing a zero-knowledge addition of the transaction value to the second account balance, and wherein the new first user token and the new second user token are digitally signed by the at least one transaction processing server.

Clause 13: The system of any of clauses 9-12, wherein the transaction request is digitally signed with a private key of the public/private key pair associated with the first user, and wherein verifying the transaction request comprises decrypting the transaction request using the public key of the public/private key pair associated with the first user.

Clause 14: The system of any of clauses 9-13, wherein the transaction request is further digitally signed with a private key of the public/private key pair associated with the second user, and wherein verifying the transaction request further comprises decrypting the transaction request using the public key of the public/private key pair associated with the second user.

Clause 15: A computer program product comprising at least one non-transitory computer-readable medium including program instructions that, when executed by at least one processor, cause the at least one processor to: receive a transaction request initiated by at least one of a first computing device associated with a first user and a second computing device associated with a second user, the transaction request comprising: a first user token comprising a first token identifier and a first account balance, the first account balance encrypted with a public key of a public/private key pair associated with the first user; a second user token comprising a second token identifier and a second account balance, the second account balance encrypted with a public key of a public/private key pair associated with the second user; and a transaction value; in response to verifying the transaction request, generate, using a zero-knowledge computation, a new first account balance and a new second account balance based on the first account balance, the second account balance, and the transaction value; generate a new first user token comprising the new first account balance, the new first account balance encrypted with the public key of the public/private key pair associated with the first user; and generate a new second user token comprising the new second account balance, the new second account balance encrypted with the public key of the public/private key pair associated with the second user.

Clause 16: The computer program product of clause 15, wherein the program instructions further cause the at least one processor to: in response to receiving, from an issuer system associated with the first user, a first initial account balance encrypted with the public key of the public/private key pair associated with the first user: generate the first user token; and communicate the first user token to the first computing device associated with the first user; and in response to receiving, from an issuer system associated with the second user, a second initial account balance encrypted with the public key of the public/private key pair associated with the second user: generate the second user token; and communicate the second user token to the second computing device associated with the second user.

Clause 17: The computer program product of clause 15 or clause 16, wherein the transaction value is encrypted with the public key of the public/private key pair associated with the first user.

Clause 18: The computer program product of any of clauses 15-17, wherein generating the new first account balance comprises executing a zero-knowledge subtraction of the transaction value from the first account balance, wherein generating the new second account balance comprises executing a zero-knowledge addition of the transaction value to the second account balance, and wherein the new first user token and the new second user token are digitally signed by the at least one transaction processing server.

Clause 19: The computer program product of any of clauses 15-18, wherein the transaction request is digitally signed with a private key of the public/private key pair associated with the first user, and wherein verifying the transaction request comprises decrypting the transaction request using the public key of the public/private key pair associated with the first user.

Clause 20: The computer program product of any of clauses 15-19, wherein the transaction request is further digitally signed with a private key of the public/private key pair associated with the second user, and wherein verifying the transaction request further comprises decrypting the transaction request using the public key of the public/private key pair associated with the second user.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments or aspects that are illustrated in the accompanying schematic figures, in which.

DETAILED DESCRIPTION

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments or aspects, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "digital signature" refers to data generated based on an input (e.g., a message) that can be used to validate the authenticity of that input. For example, a digital signature may be generated based on processing input data with a cryptographic key (e.g., a private key in a public/private key pair, shared symmetric keys, etc.) and according to a cryptographic algorithm. The input data may be encrypted with a private key, may be hashed and then encrypted with a private key, and/or may be otherwise altered based on a key to produce the digital signature. To "digitally sign" data refers to the process of generating a digital signature based on that data. In some examples, a digital signature may be appended to or accompany the original input (which may be encrypted) for communication. A digital signature may be validated by processing it with a corresponding cryptographic key (e.g., a public key from the public/private key pair used to generate it) and according to a corresponding cryptographic algorithm. For example, a system receiving a message and a digital signature based on that message may input the message, the digital signature, and a corresponding public key to a cryptographic algorithm to determine if the digital signature is valid (e.g., and that the sender was in possession of the private key). It will be appreciated that other variations are possible for generating and validating a digital signature.

Non-limiting embodiments or aspects of the present disclosure improve over existing systems by providing secured transactions resistant to brute force and man-in-the-middle attacks. Furthermore, the described systems and methods allow for central transaction processing without requiring access to the actual values involved in the underlying transactions, promoting data privacy. Non-limiting embodiments or aspects of the described systems and methods improve computational efficiency by reducing time to validate and process transactions, facilitated by a centralizing processing authority. Non-limiting embodiments or aspects of the present disclosure also reduce the number of discrete computing devices required for processing a transaction, as compared to decentralized cryptocurrency schemes. Users may continue to be associated with issuer institutions, allowing for enhanced security protocols provided by such institutions, while user token account balances remain obfuscated after initial setup, thereby enhancing security. Furthermore, issuer institutions may store protected/encrypted backups of user private keys, thereby preventing the complete loss of token funds if a private key is lost by the user.

Figure 1:
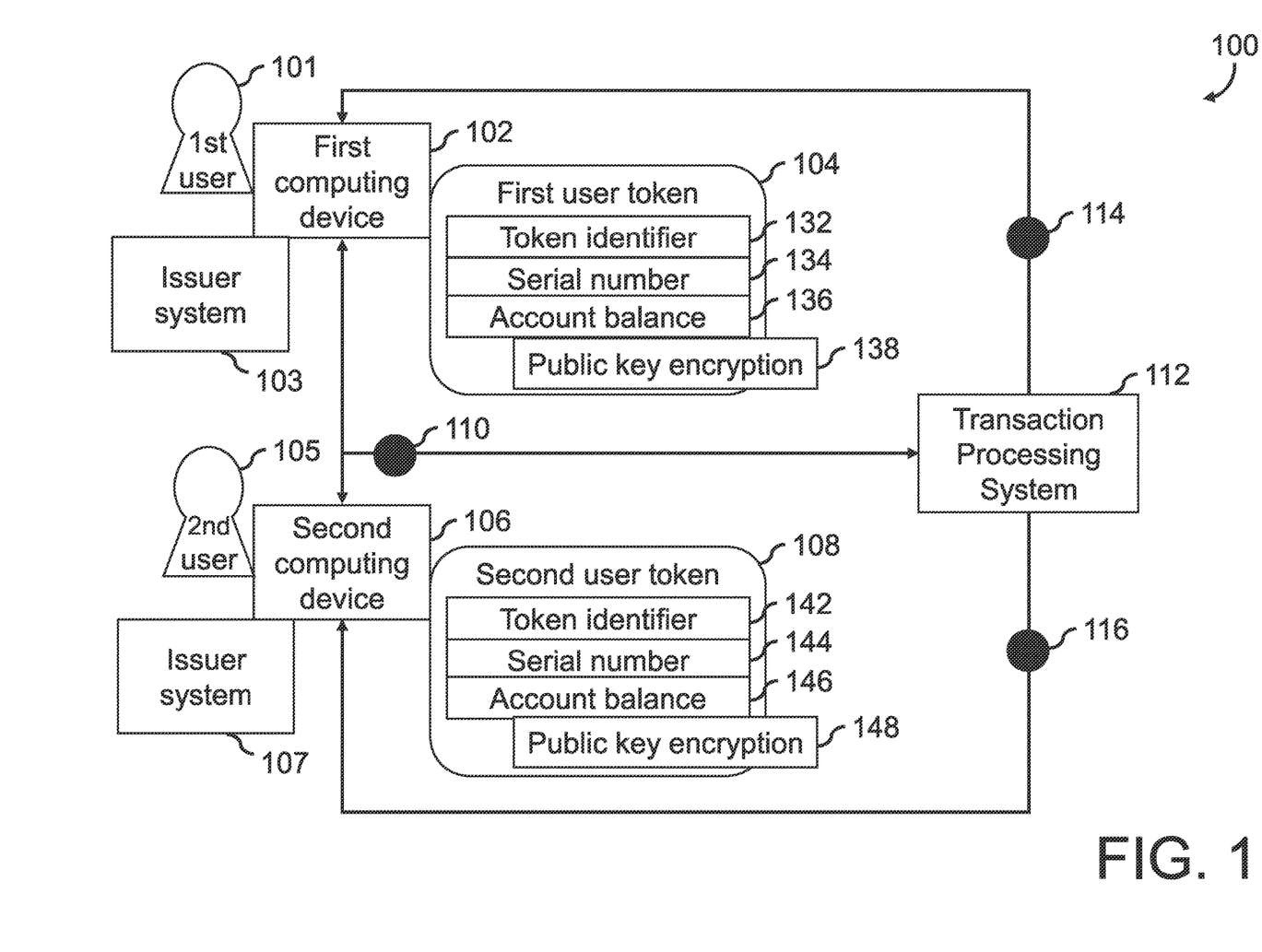
FIG. 1 is a schematic diagram of a system for secured, encrypted transaction processing according to non-limiting embodiments or aspects.

Referring to FIG. 1, provided is a system 100 for secured, encrypted transaction processing according to non-limiting embodiments or aspects. The system 100 may include a first computing device 102 associated with a first user 101 and a second computing device 106 associated with a second user 105. The first user 101 may be associated with an issuer system 103 of a first issuer institution, whereby the first user's 101 ability to transact in the system 100 was initialized. The second user 105 may be associated with an issuer system 107 of a second issuer institution, which may be the same as the first issuer institution, whereby the second user's 105 ability to transact in the system 100 was initialized. The first computing device 102 is programmed or configured to store, in a local memory, a first user token 104 (e.g., an encrypted data object representative of a present state of a digital account of the first user 101). The first user token 104 includes a token identifier 132 (e.g., a unique value or code that identifies the first user token 104), a serial number 134 (e.g., an incremental value representative of the iteration of the first user token 104), and a first account balance 136 (e.g., an amount or value associated with the first user token 104). The first account balance 136 and/or other token data may be encrypted with a public key 138 of a public/private key pair associated with the first user 101, so as to obfuscate the value associated with the first user token 104.

The second computing device 106 is programmed or configured to store, in a local memory, a second user token 108 (e.g., an encrypted data object representative of a present state of a digital account of the second user 105). The second user token 108 includes a token identifier 142 (e.g., a unique value or code that identifies the second user token 108), a serial number 142 (e.g., an incremental value representative of the iteration of the second user token 108), and a second account balance 146 (e.g., an amount or value associated with the second user token 108). The second account balance 146 and/or other token data may be encrypted with a public key 148 of a public/private key pair associated with the second user 105, so as to obfuscate the value associated with the second user token 108.

The first user 101 may communicate with the second user 105 via messages (e.g., data packets) between the first computing device 102 and the second computing device 106. The first user 101 and the second user 105 may agree to transact for a payment, such as from the first user 101 to the second user 105 or from the second user 105 to the first user 101. When the users 101, 105 agree, a transaction request 110 may be transmitted to the transaction processing system 112 (or to another system such as a payment gateway that subsequently communicates the transaction request 110 to the transaction processing system 112) by the first computing device 102 and/or the second computing device 106. The transaction request 110 may include the first user token 104, the second user token 108, and a transaction value. The transaction request 110 may include additional data and/or may arrange the order of the tokens 104, 108 so as to indicate the payee and the payor of the transaction to be completed. The transaction request 110 may be digitally signed using a private key of another public/private key pair of the user associated with the submission of the transaction request 110. For example, the first computing device 102 may communicate the transaction request 110 to the transaction processing system 112 after digitally signing the transaction request 110 with the private key of the public/private key pair associated with (e.g., possessed by) the first user 101 to generate a digital signature.

The transaction processing system 112, in response to receiving the transaction request 110, may verify the transaction request 110 (e.g., determine the validity/authenticity of the request for a transaction between the first user 101 and the second user 105). Verification of the transaction request 110 may be based on validating the digital signature using the public key of the public/private key pair associated with the digital signature of the transaction request 110. For example, if the transaction request 110 is digitally signed with the private key of the public/private key pair of the first user 101, the transaction processing system 112 may verify the transaction request 110 by decrypting the digital signature using the corresponding public key. The transaction request 110 may be digitally signed with the private key of the first user 101 and/or the second user 105. The transaction request 110 may include additional data, or the transaction processing system 112 may permute through the limited arrangements, to verify which or both parties that digitally signed the transaction request 110.

In response to verifying the transaction request 110, the transaction processing system 112 may generate, using a zero-knowledge computation, a new first account balance and a new second account balance based on the first account balance 136, the second account balance 146, and the transaction value of the transaction request 110. The zero-knowledge computation provides for the subtraction or addition of the encrypted transaction value from the encrypted account balances 136, 146 without revealing the values to the transaction processing system 112, thus maintaining security and privacy of the users 101, 105 involved with the transaction. For example, for an agreed transaction for payment from the first user 101 to the second user 105, the transaction processing system 112 may execute a zero-knowledge subtraction of the encrypted transaction value from the first account balance 136 to generate a new encrypted first account balance, and the transaction processing system 112 may execute a zero-knowledge addition of the encrypted transaction value to the second account balance 146 to generate a new encrypted second account balance. Example schemes that may be used for zero-knowledge computation include, but are not limited to, the Benaloh cryptosystem, the Paillier cryptosystem, and zero-knowledge accumulators and set operations.

In some non-limiting embodiments or aspects, the transaction processing system 112 may generate a new first user token 114 including the new first account balance that remains encrypted with the public key of the public/private key pair associated with the first user 101. The transaction processing system 112 may digitally sign the new first user token 114 to provide a verification of the authenticity of the new first user token 114. The new first user token 114 may have a same token identifier 132 as the previous first user token 104 but a new serial number (e.g., incremented by one) to identify the new first user token 114 and indicate a state/version of the new first user token 114, respectively. The transaction processing system 112 may generate a new second user token 116 including the new second account balance that remains encrypted with the public key of the public/private key pair associated with the second user 105.

The transaction processing system 112 may digitally sign the new second user token 116 to provide a verification of the authenticity of the new second user token 116. The new second user token 116 may have the same token identifier 142 as the previous second user token 108 but a new serial number (e.g., incremented by one) to identify the new second user token 116 and indicate a state/version of the new second user token 116, respectively. The transaction processing system 112 may communicate the new first user token 114 to the first computing device 102 and the new second user token 116 to the second computing device 106, either directly or indirectly (e.g., through an issuer institution associated with the respective computing device 102, 106, or through the computing device 102, 106 that communicated the transaction request 110 to the transaction processing system 112). For directly communicated new tokens 114, 116, the transaction processing system 112 may communicate a confirmation to one computing device (e.g., 102) when the other computing device (e.g., 106) has confirmed receipt of its respective new token 114, 116.

Figure 2:
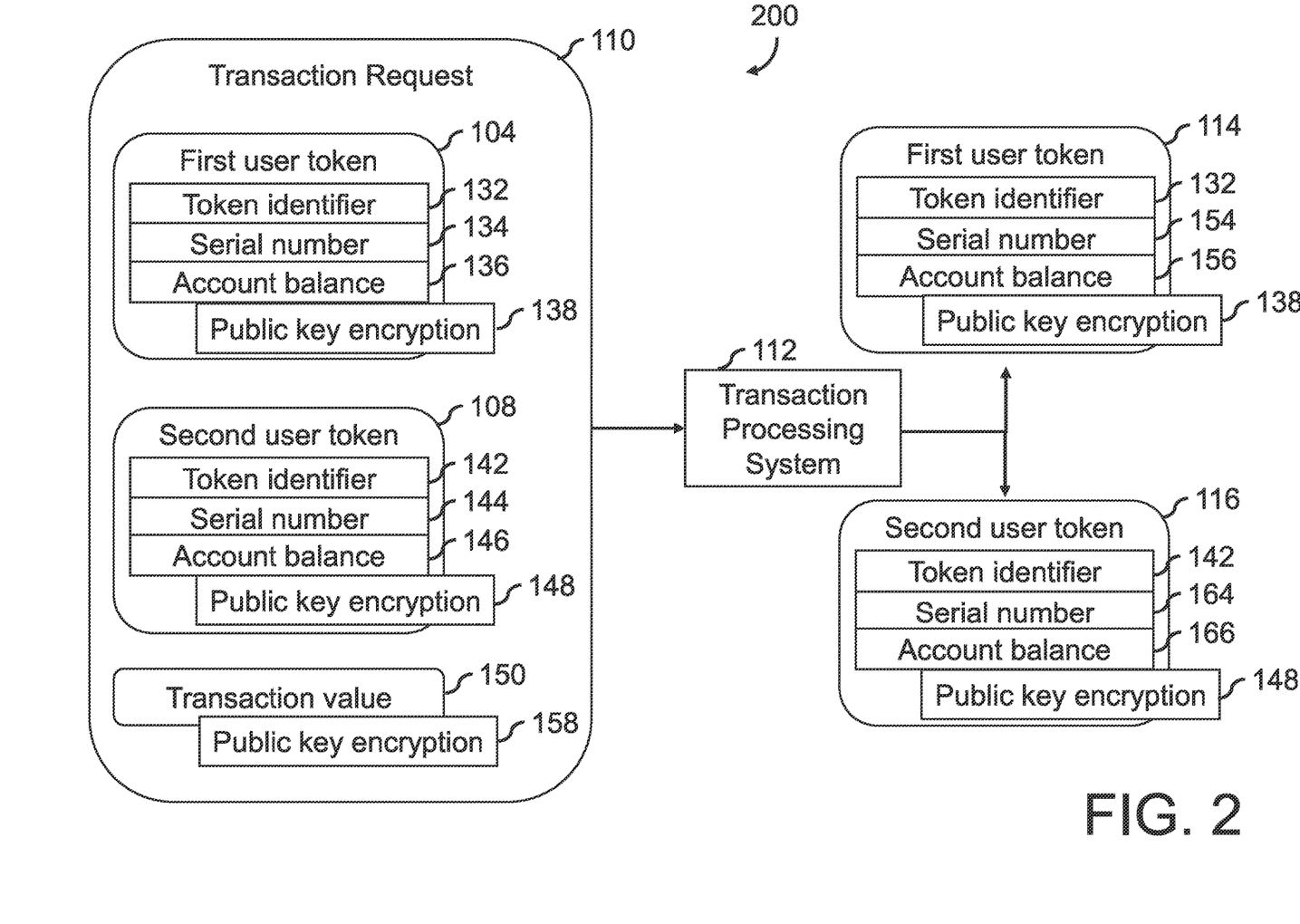
FIG. 2 is a schematic diagram of a system for secured, encrypted transaction processing according to non-limiting embodiments or aspects.

Referring to FIG. 2, provided is a system 200 for secured, encrypted transaction processing according to non-limiting embodiments or aspects. When transacting users agree, a transaction request 110 may be transmitted to the transaction processing system 112 by one or more computing devices of the users. The transaction request 110 may include the first user token 104, the second user token 108, and a transaction value 150. The transaction request 110 may include additional data or arrange the order of the tokens 104, 108 so as to indicate the payee and the payor of the transaction to be completed. The transaction request 110 may be digitally signed using a private key of a public/private key pair of the user associated with (e.g., possessed by) the submission of the transaction request 110 to generate a digital signature.

The transaction processing system 112, in response to receiving the transaction request 110, may verify the transaction request 110 (e.g., determine the validity/authenticity of the request for a transaction between the users). Verification may include validation of the signatures of the tokens (e.g., keys are operational and not revoked), validation of the signature of the transaction, verification of consistent currencies used in token account balances and transaction value 150, and/or verification that the transaction value 150 is less than the amount of the account balance of the token of the paying party (e.g., through a zero-knowledge computation). Verification of the transaction request 110 may be based on validating the digital signature using the public key of the public/private key pair associated with the digital signing of the transaction request 110. The transaction request 110 may include additional data, or the transaction processing system 112 may permute through the limited arrangements, to verify which or both parties that digitally signed the transaction request 110. In response to verifying the transaction request 110, the transaction processing system 112 may generate, using a zero-knowledge computation, a new first account balance 156 and a new second account balance 166 based on the first account balance 136, the second account balance 146, and the transaction value 150 of the transaction request 110. The zero-knowledge computation provides for the subtraction or addition of the encrypted transaction value 150 from the encrypted account balances 136, 146 without revealing the values to the transaction processing system 112, maintaining security and privacy of the users involved with the transaction.

The transaction processing system 112 may generate a new first user token 114 including the new first account balance 156 that remains encrypted with the public key of the public/private key pair associated with the first user. The transaction processing system 112 may digitally sign the new first user token 114 to provide verification of the authenticity of the new first user token 114. The new first user token 114 may have a same token identifier 132 as the previous first user token 104 but a new serial number 154 (e.g., incremented by one) to identify the new first user token 114 and indicate a state/version of the new first user token 114, respectively. The transaction processing system 112 may generate a new second user token 116 including the new second account balance 166 that remains encrypted with the public key of the public/private key pair associated with the second user. The transaction processing system 112 may digitally sign the new second user token 116 to provide verification of the authenticity of the new second user token 116. The new second user token 116 may have the same token identifier 142 as the previous second user token 108 but a new serial number 164 (e.g., incremented by one) to identify the new second user token 116 and indicate a state/version of the new second user token 116, respectively. The transaction processing system 112 may include a database of token identifiers and corresponding serial numbers representative of current, valid tokens. For example, if a transaction request 110 is received that includes a token having a serial number that is not the most up-to-date serial number for the token, the transaction request 110 may be declined, thereby maintaining security and efficacy of the system.

The tokens 104, 108, 114, 116 may further contain personal information associated with the identity or address of the corresponding user, which may enable transactions in certain instances where a transaction might otherwise be prohibited by regulation. The personal information may be provided by a trusted entity (e.g., as part of a public key hierarchy) so that the root of the trust (e.g., a transaction system) could certify which entities (e.g., issuer institutions) are trusted to issue personal information attributes. The transaction request 110 may further contain additional data relevant to the execution of the transaction, including identity of the payee user, identity of the payor user, currency, date of transaction, time of transaction, expiry of transaction (e.g., a date and/or time after which the transaction cannot be validly processed). The additional transaction information may be encrypted along with the transaction value.

Figure 3:
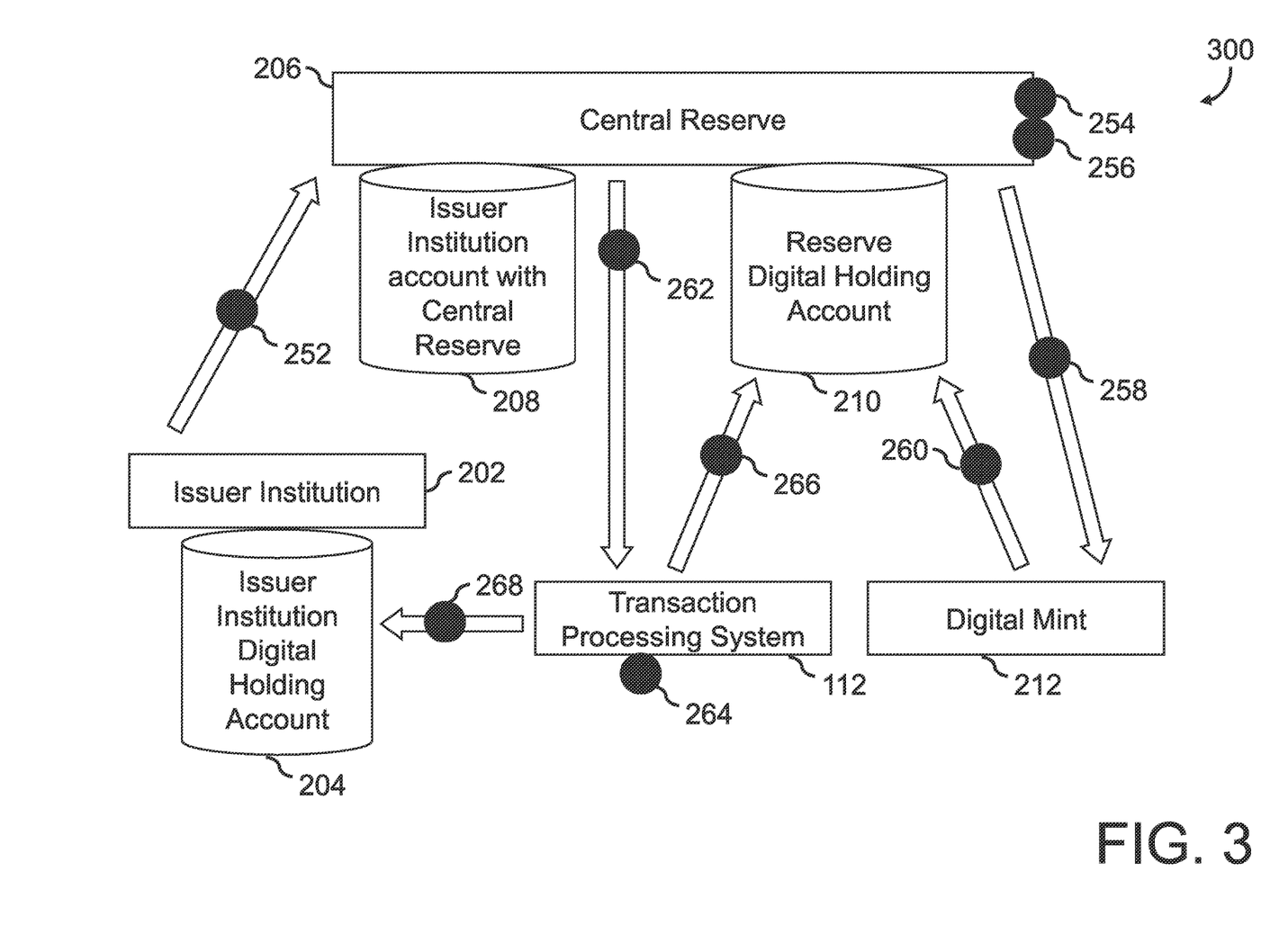
FIG. 3 is a schematic and process diagram of a system for secured, encrypted transaction processing according to non-limiting embodiments or aspects.

Referring to FIG. 3, provided is a system 300 for secured, encrypted transaction processing according to non-limiting embodiments or aspects, depicting an architecture for issuer institutions 202 to request digital money from a central reserve 206 (e.g., the Federal Reserve or some other like entity). The system includes one or more issuer institutions 202, each associated with a digital holding account 204 including one or more tokens having a balance of digital currency for the issuer institution 202. Issuer institutions 202 may assign digital currency to tokens of users from their own digital holding account 204 of one or more tokens. To convert regular currency to digital currency, an issuer institution 202 communicates a transfer request 252 to the central reserve 206 for an amount of regular currency to be converted to an equivalent value in digital currency. The transfer request 252 may include a token of the issuer institution 202. The central reserve 206 validates 254 that the requesting issuer institution 202 has sufficient funds in a corresponding issuer institution account 208 held with the central reserve 206, and validates 254 that the central reserve 206 has sufficient equivalent digital funds in a central reserve digital holding account 210, which may include one or more tokens of the central reserve 206. If the issuer institution 202 does not have sufficient funds in its corresponding issuer institution account 208, the central reserve 206 may decline the transfer request 252. If the issuer institution 202 does have sufficient funds in its corresponding issuer institution account 208, the central reserve 206 may subtract 256 the requested amount to be transferred from the balance of the issuer institution account 208.

With continued reference to FIG. 3, if the central reserve 206 does not have sufficient equivalent digital funds in the central reserve digital holding account 210, the central reserve 206 may communicate a minting request 258 to a digital mint 212 for an amount equal to or greater than the deficiency in digital funds. The digital mint 212 may be an entity operated and/or controlled by the central reserve 206. In response to the minting request 258, the digital mint 212 may generate and transfer 260 the requested digital funds from the minting request 258 to the central reserve digital holding account 210. Once the central reserve 206 verifies that the central reserve digital holding account 210 has sufficient equivalent funds to satisfy the transfer request 252 from the issuer institution 202, the central reserve 206 may communicate a transaction request 262 to a transaction processing system 112 to subtract the requested value of digital funds from the central reserve digital holding account 210 and add the requested value of digital funds to the issuer institution digital holding account 204. The transaction request 262 may include the token of the issuer institution 202 and a token of the central reserve 206.

In some non-limiting embodiments or aspects, in response to receiving the transaction request 262 from the central reserve 206 and verifying the transaction request 262, the transaction processing system 112 may process 264 the transaction request 262 to debit the reserve digital holding account 210 and credit the issuer institution digital holding account 204 using a zero-knowledge computation and the provided tokens of the issuer institution 202 and the central reserve 206. In doing so, the transaction processing system 112 may generate a new token for the issuer institution 202 and a new token for the central reserve 206. The transaction processing system 112 may then communicate 266 the new token for the central reserve 206 back to the central reserve 206. The transaction processing system 112 may also communicate 268 the new token for the issuer institution 202 back to the issuer institution 202. The new token of the central reserve 206 will include a balance that is reduced the amount of the transfer request 252, and the new token of the issuer institution 202 will include a balance that is increased the amount of the transfer request 252.

Figure 4:
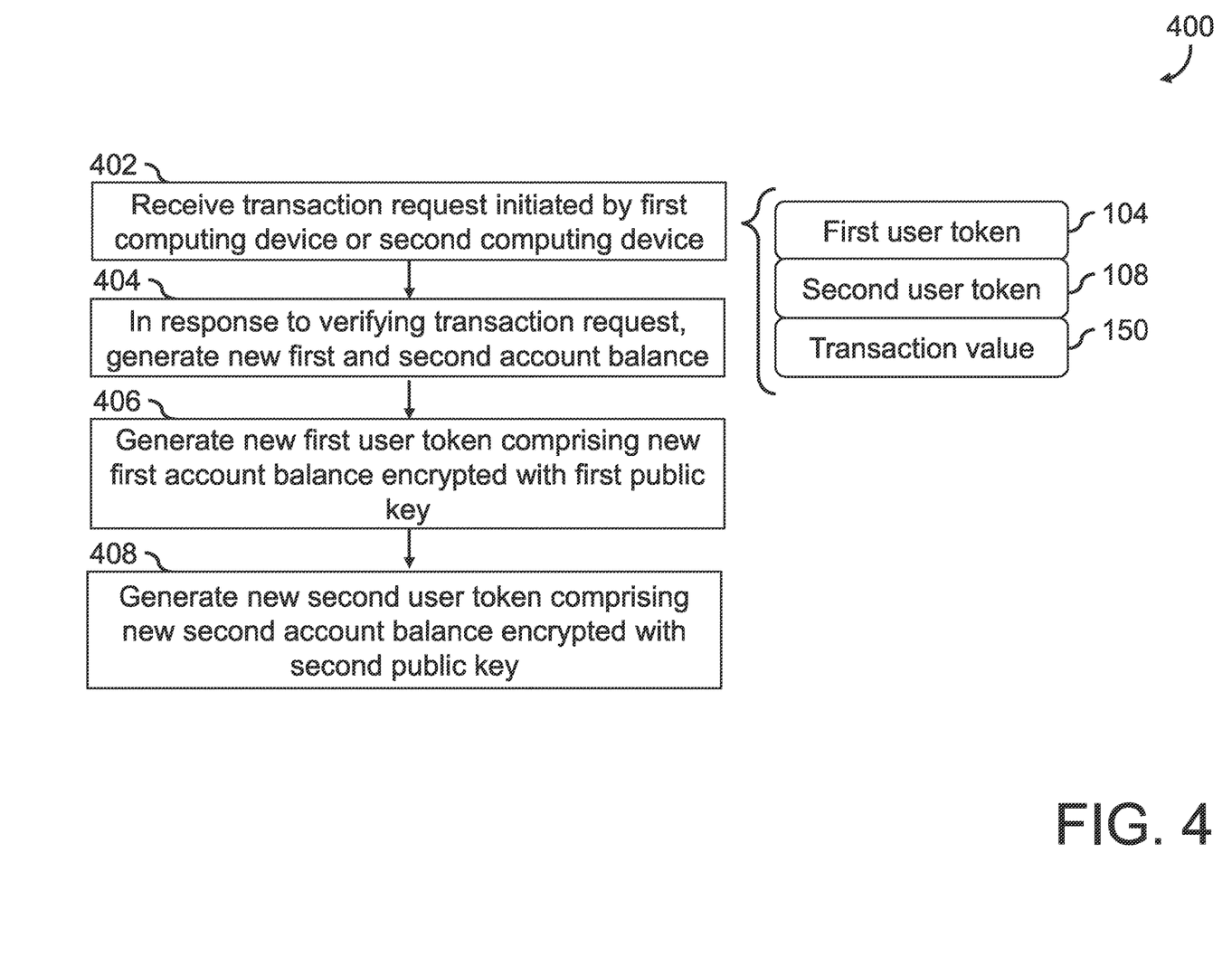
FIG. 4 is a process diagram of a system for secured, encrypted transaction processing according to non-limiting embodiments or aspects.

Referring to FIG. 4, provided is a method 400 for secured, encrypted transaction processing according to non-limiting embodiments or aspects. The method 400 may be executed by one or more processors of a transaction processing system 112, a first computing device 102, a second computing device 106, and/or other computing device. In step 402, the transaction processing system 112 receives a transaction request initiated by at least one of a first computing device associated with a first user and a second computing device associated with a second user. The transaction request represents a request for a transfer of value from one user token to another. The transaction request includes a first user token 104 including a first token identifier and a first account balance. The first account balance is encrypted with a public key of a public/private key pair associated with the first user. The transaction request also includes a second user token 108. The second user token includes a second token identifier and a second account balance. The second account balance is encrypted with a public key of a public/private key pair associated with the second user. The transaction request further includes a transaction value 150. The transaction value 150 may be encrypted with the public key of the public/private key pair associated with the first user. The transaction request may be digitally signed with a private key of the public/private key pair associated with the first user and/or a private key of the public/private key pair associated with the second user.

In step 404, the transaction processing system may verify the transaction request. Verifying the transaction request may include validating the digital signature of the transaction request, or an attribute thereof, using the public key of the public/private key pair associated with the first user and/or the second user. Further in step 404, in response to verifying the transaction request, the transaction processing system generates, using a zero-knowledge computation, a new first account balance and a new second account balance based on the first account balance, the second account balance, and the transaction value. For example, the transaction processing system may, in the encryption domain, compute a subtraction of the encrypted transaction value from the encrypted account balance of the payor, and compute an addition to the encrypted transaction value of the payee. In step 406, the transaction processing system may generate a new first user token including the new first account balance. The new first account balance may continue to be encrypted with the public key of the public/private key pair associated with the first user. The new first user token may be digitally signed by the transaction processing system. In step 408, the transaction processing system may generate a new second user token including the new second account balance. The new second account balance may continue to be encrypted with the public key of the public/private key pair associated with the second user. The new second user token may be digitally signed by the transaction processing system.

Figure 5:
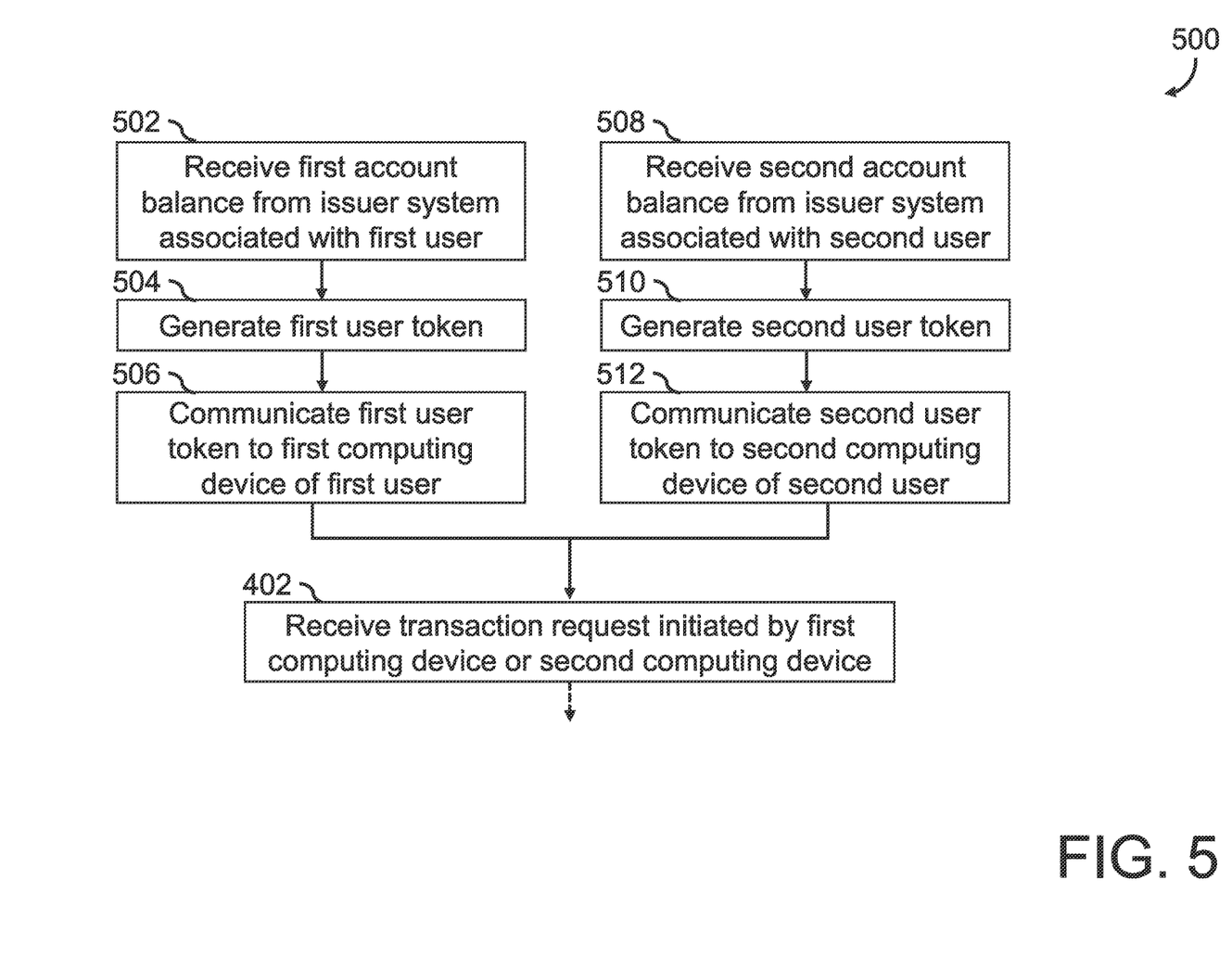
FIG. 5 is a process diagram of a system for secured, encrypted transaction processing according to non-limiting embodiments or aspects.

Referring to FIG. 5, provided is a method 500 for secured, encrypted transaction processing according to non-limiting embodiments or aspects. The method 500 may be executed by one or more processors of a transaction processing system 112, a first computing device 102, a second computing device 106, a first issuer system 103, a second issuer system 107, and/or other computing device. Method 500 depicts an example initialization process to generate initial tokens for users, after which users may transact using the tokens. In step 502, the transaction processing system may receive, from an issuer system associated with the first user, a first initial account balance encrypted with the public key of the public/private key pair associated with the first user. The first initial account balance may be generated and verified in funds by the issuer system so as to allow a first user token to be generated including the first initial account balance. In response to receiving the first initial account balance, the transaction processing system may, in step 504, generate the first user token including the first initial account balance and communicate, in step 506, the first user token to the first computing device associated with the first user.

In step 508, the transaction processing system may receive, from an issuer system associated with the second user, a second initial account balance encrypted with the public key of the public/private key pair associated with the second user. The second initial account balance may be generated and verified in funds by the issuer system so as to allow a second user token to be generated including the second initial account balance. In response to receiving the second initial account balance, the transaction processing system may, in step 510, generate the second user token including the second initial account balance and communicate, in step 512, the second user token to the second computing device associated with the second user. Thereafter, users may interact via respective computing devices and communicate a transaction request to the transaction processing system, in step 402.

Figure 6:
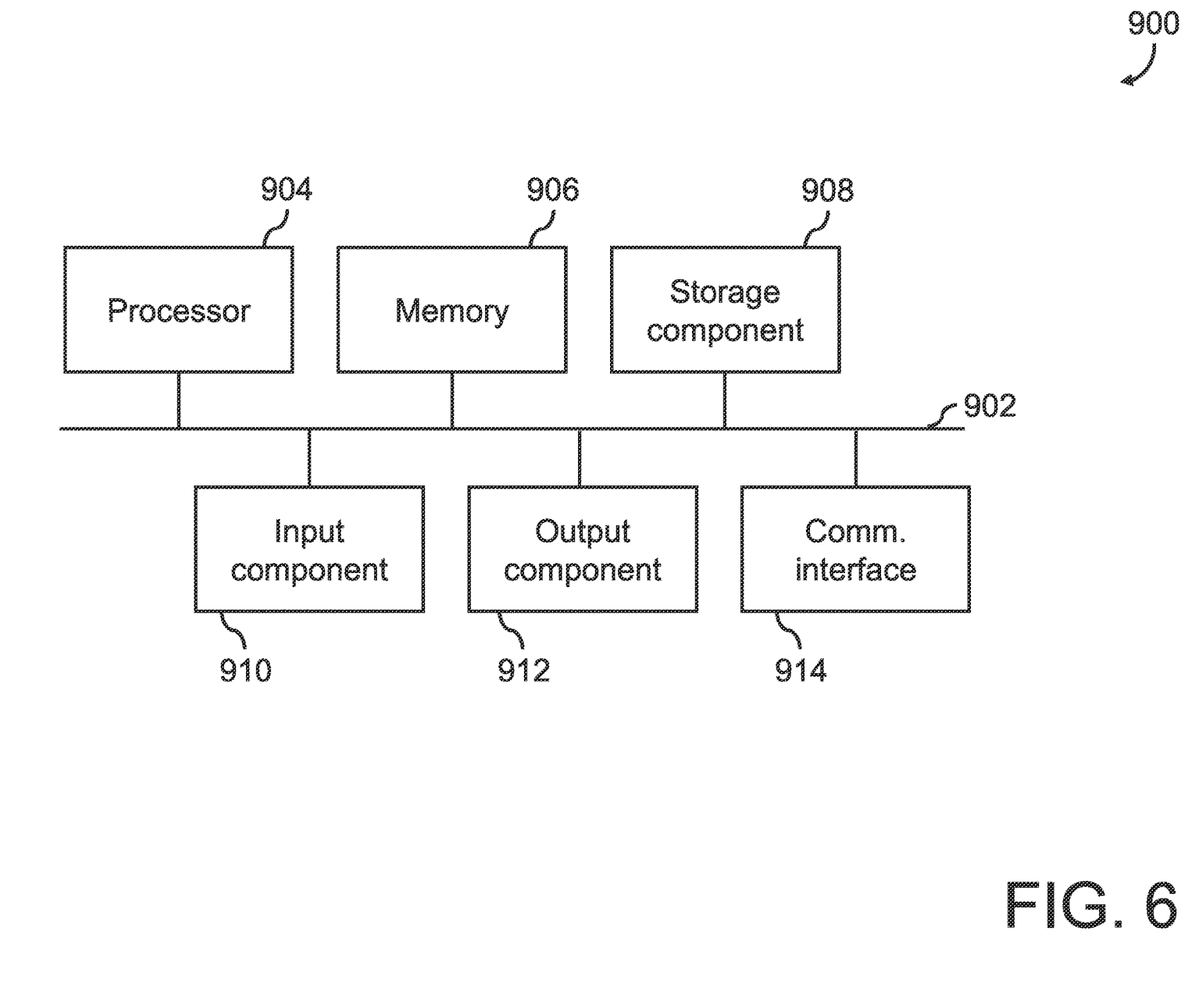
FIG. 6 is a schematic diagram of a computing device for use in a system for secured, encrypted transaction processing according to non-limiting embodiments or aspects.

Referring now to FIG. 6, illustrated is a diagram of example components of device 900. Device 900 may correspond to one or more devices of first computing device 102, second computing device 106, transaction processing system 112, issuer system 103, issuer system 107, issuer institution 202, central reserve 206, and/or digital mint 212. In some non-limiting embodiments or aspects, one or more devices of the foregoing may include at least one device 900 and/or at least one component of device 900. As shown in FIG. 6, device 900 may include a bus 902, a processor 904, memory 906, a storage component 908, an input component 910, an output component 912, and a communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, the non-limiting embodiments or aspects described herein are not limited to any specific combination of hardware circuitry and software. The term "programmed or configured," as used herein, refers to an arrangement of software, hardware circuitry, or any combination thereof on one or more devices.

Although the present disclosure has been described in detail for the purpose of illustration, it is to be understood that such detail is solely for that purpose and that the disclosure is not limited to the disclosed embodiments and aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
   receiving, with a transaction processing system, a transaction request initiated by at least one of a first computing device associated with a first user and a second computing device associated with a second user, the transaction request comprising:
   a first user token comprising a first account balance, the first account balance encrypted with a public key of a public/private key pair associated with the first user;
   a second user token comprising a second account balance, the second account balance encrypted with a public key of a public/private key pair associated with the second user; and
   a transaction value;
   generating, with the transaction processing system, a new first account balance by executing a zero-knowledge subtraction of the transaction value from the first account balance;
   generating, with the transaction processing system, a new first user token comprising the new first account balance, the new first account balance encrypted with the public key of the public/private key pair associated with the first user;
   transmitting, with the transaction processing system, the new first user token to the first computing device;
   generating, with the transaction processing system, a new second account balance by executing a zero-knowledge addition of the transaction value to the second account balance;
   generating, with the transaction processing system, a new second user token comprising the new second account balance, the new second account balance encrypted with the public key of the public/private key pair associated with the second user;

transmitting, with the transaction processing system, the new second user token to the second computing device;

receiving, with the transaction processing system, a new transaction request initiated by at least one of the first computing device and the second computing device, the new transaction request comprising at least one of the new first user token and the new second user token; and generating, with the transaction processing system, at least one new account balance associated with at least one of the first user and the second user by executing a zero-knowledge computation based on the new transaction request and at least one of the new first user token and the new second user token.

2. The computer-implemented method of claim 1, further comprising, in response to receiving, from an issuer system associated with the first user, a first initial account balance encrypted with the public key of the public/private key pair associated with the first user:

generating, with the transaction processing system, the first user token; and communicating, with the transaction processing system, the first user token to the first computing device associated with the first user.

3. The computer-implemented method of claim 2, further comprising, in response to receiving, from an issuer system associated with the second user, a second initial account balance encrypted with the public key of the public/private key pair associated with the second user:

generating with the transaction processing system, the second user token; and communicating, with the transaction processing system, the second user token to the second computing device associated with the second user.

4. The computer-implemented method of claim 1, wherein the transaction value is encrypted with the public key of the public/private key pair associated with the first user.

5. The computer-implemented method of claim 1, further comprising:

in response to receiving the transaction request, verifying, with the transaction processing system, the transaction request based on a digital signature of the transaction request; and in response to verifying the transaction request, generating, with the transaction processing system, the new first account balance and the new second account balance.

6. The computer-implemented method of claim 5, wherein the transaction request is digitally signed with a private key of the public/private key pair associated with the first user, and wherein verifying the transaction request comprises decrypting, by the transaction processing system, the transaction request using the public key of the public/private key pair associated with the first user.

7. The computer-implemented method of claim 6, wherein the transaction request is further digitally signed with a private key of the public/private key pair associated with the second user, and wherein verifying the transaction request further comprises decrypting, by the transaction processing system, the transaction request using the public key of the public/private key pair associated with the second user.

8. A system comprising at least one processor of a transaction processing system, the at least one processor programmed or configured to:

receive a transaction request initiated by at least one of a first computing device associated with a first user and a second computing device associated with a second user, the transaction request comprising:
  a first user token comprising a first account balance, the first account balance encrypted with a public key of a public/private key pair associated with the first user;
  a second user token comprising a second account balance, the second account balance encrypted with a public key of a public/private key pair associated with the second user; and
  a transaction value;

generate a new first account balance by executing a zero-knowledge subtraction of the transaction value from the first account balance;

generate a new first user token comprising the new first account balance, the new first account balance encrypted with the public key of the public/private key pair associated with the first user;

transmit the new first user token to the first computing device;

generate a new second account balance by executing a zero-knowledge addition of the transaction value to the second account balance;

generate a new second user token comprising the new second account balance, the new second account balance encrypted with the public key of the public/private key pair associated with the second user;

transmit the new second user token to the second computing device;

receive a new transaction request initiated by at least one of the first computing device and the second computing device, the new transaction request comprising at least one of the new first user token and the new second user token; and generate at least one new account balance associated with at least one of the first user and the second user by executing a zero-knowledge computation based on the new transaction request and at least one of the new first user token and the new second user token.

9. The system of claim 8, wherein the at least one processor is further programmed or configured to:

in response to receiving, from an issuer system associated with the first user, a first initial account balance encrypted with the public key of the public/private key pair associated with the first user:
generate the first user token; and
communicate the first user token to the first computing device associated with the first user.

10. The system of claim 9, wherein the at least one processor is further programmed or configured to:

in response to receiving, from an issuer system associated with the second user, a second initial account balance encrypted with the public key of the public/private key pair associated with the second user:
generate the second user token; and
communicate the second user token to the second computing device associated with the second user.

11. The system of claim 8, wherein the transaction value is encrypted with the public key of the public/private key pair associated with the first user.

12. The system of claim 8, wherein the at least one processor is further programmed or configured to:

in response to receiving the transaction request, verify the transaction request based on a digital signature of the transaction request; and in response to verifying the transaction request, generate the new first account balance and the new second account balance.

13. The system of claim 12, wherein the transaction request is digitally signed with a private key of the public/private key pair associated with the first user, and wherein, while verifying the transaction request, the at least one processor is programmed or configured to decrypt the transaction request using the public key of the public/private key pair associated with the first user.

14. The system of claim 13, wherein the transaction request is further digitally signed with a private key of the public/private key pair associated with the second user, and wherein, while verifying the transaction request, the at least one processor is programmed or configured to decrypt the transaction request using the public key of the public/private key pair associated with the second user.

15. A computer program product comprising at least one non-transitory computer-readable medium storing one or more instructions that, when executed by at least one processor, cause the at least one processor to:
  receive a transaction request initiated by at least one of a first computing device associated with a first user and a second computing device associated with a second user, the transaction request comprising:
    a first user token comprising a first account balance, the first account balance encrypted with a public key of a public/private key pair associated with the first user;
    a second user token comprising a second account balance, the second account balance encrypted with a public key of a public/private key pair associated with the second user; and
    a transaction value;
  generate a new first account balance by executing a zero-knowledge subtraction of the transaction value from the first account balance;
  generate a new first user token comprising the new first account balance, the new first account balance encrypted with the public key of the public/private key pair associated with the first user;
  transmit the new first user token to the first computing device for storage on the first computing device as a current first user token of the first user and for use in future transactions by the first user;
  generate a new second account balance by executing a zero-knowledge addition of the transaction value to the second account balance;
  generate a new second user token comprising the new second account balance, the new second account balance encrypted with the public key of the public/private key pair associated with the second user;
  transmit the new second user token to the second computing device for storage on the second computing device as a current second user token of the second user and for use in future transactions by the second user;
  receive a new transaction request initiated by at least one of the first computing device and the second computing device, the new transaction request comprising at least one of the new first user token and the new second user token; and
  generate at least one new account balance associated with at least one of the first user and the second user by executing a zero-knowledge computation based on the new transaction request and at least one of the new first user token and the new second user token.

16. The computer program product of claim 15, wherein the one or more instructions further cause the at least one processor to:
  in response to receiving, from an issuer system associated with the first user, a first initial account balance encrypted with the public key of the public/private key pair associated with the first user:
    generate the first user token; and
    communicate the first user token to the first computing device associated with the first user; and
  in response to receiving, from an issuer system associated with the second user, a second initial account balance encrypted with the public key of the public/private key pair associated with the second user:
    generate the second user token; and
    communicate the second user token to the second computing device associated with the second user.

17. The computer program product of claim 15, wherein the transaction value is encrypted with the public key of the public/private key pair associated with the first user.

18. The computer program product of claim 15, wherein the one or more instructions further cause the at least one processor to:
  in response to receiving the transaction request, verify the transaction request based on a digital signature of the transaction request; and
  in response to verifying the transaction request, generate the new first account balance and the new second account balance.

19. The computer program product of claim 18, wherein the transaction request is digitally signed with a private key of the public/private key pair associated with the first user, and wherein the one or more instructions that cause the at least one processor to verify the transaction request cause the at least one processor to decrypt the transaction request using the public key of the public/private key pair associated with the first user.

20. The computer program product of claim 19, wherein the transaction request is further digitally signed with a private key of the public/private key pair associated with the second user, and wherein the one or more instructions that cause the at least one processor to verify the transaction request cause the at least one processor to decrypt the transaction request using the public key of the public/private key pair associated with the second user.

* * * * *